Nov. 27, 1962
W. R. LINDEMANN
3,065,688
EGG COOKER
Filed July 26, 1960
2 Sheets-Sheet 1
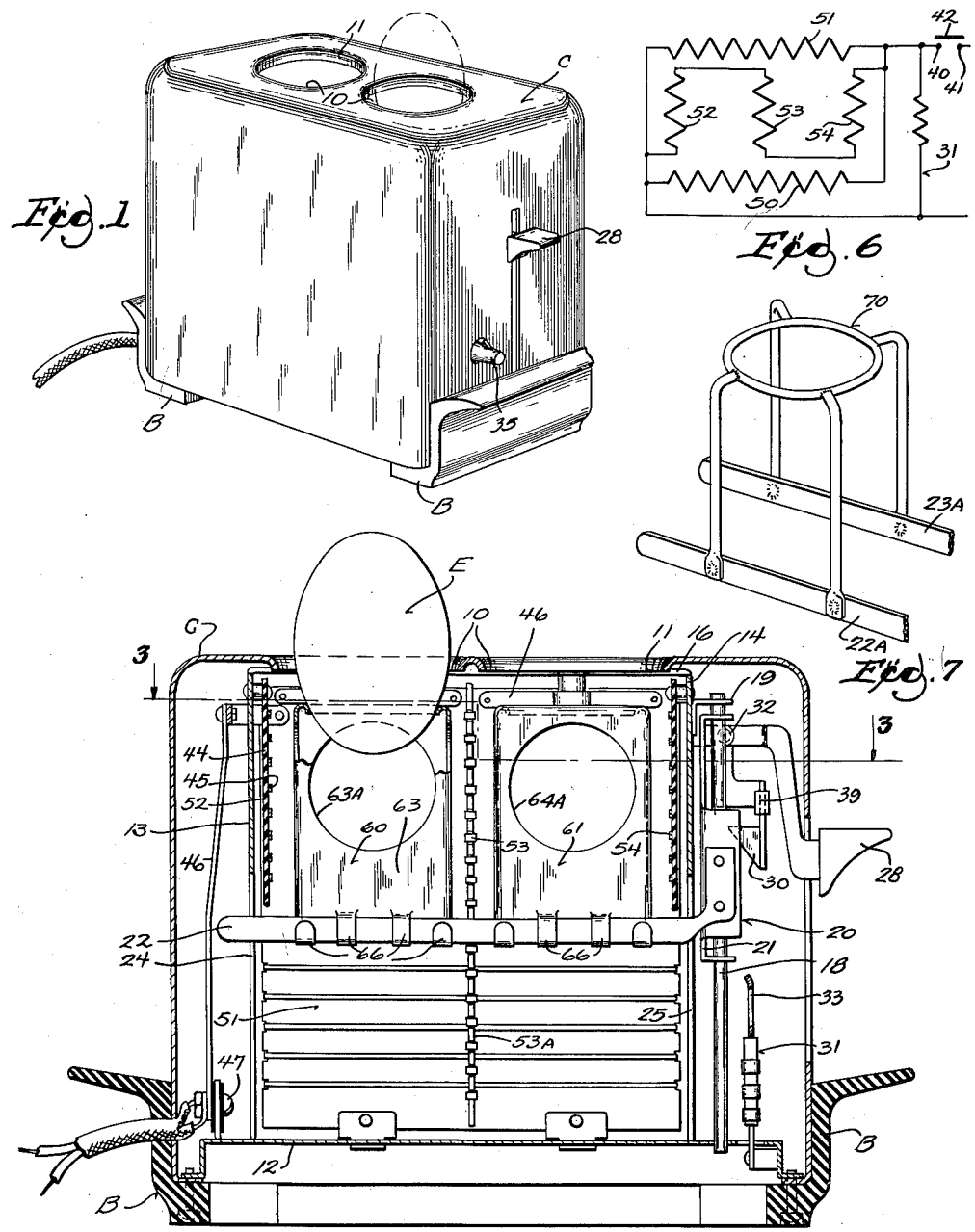
INVENTOR.
WALTER R. LINDEMANN
BY
Lieber, Lieber & Nilles
ATTORNEYS Nov. 27, 1962 W. R. LINDEMANN 3,065,688
EGG COOKER
Filed July 26, 1960 2 Sheets-Sheet 2
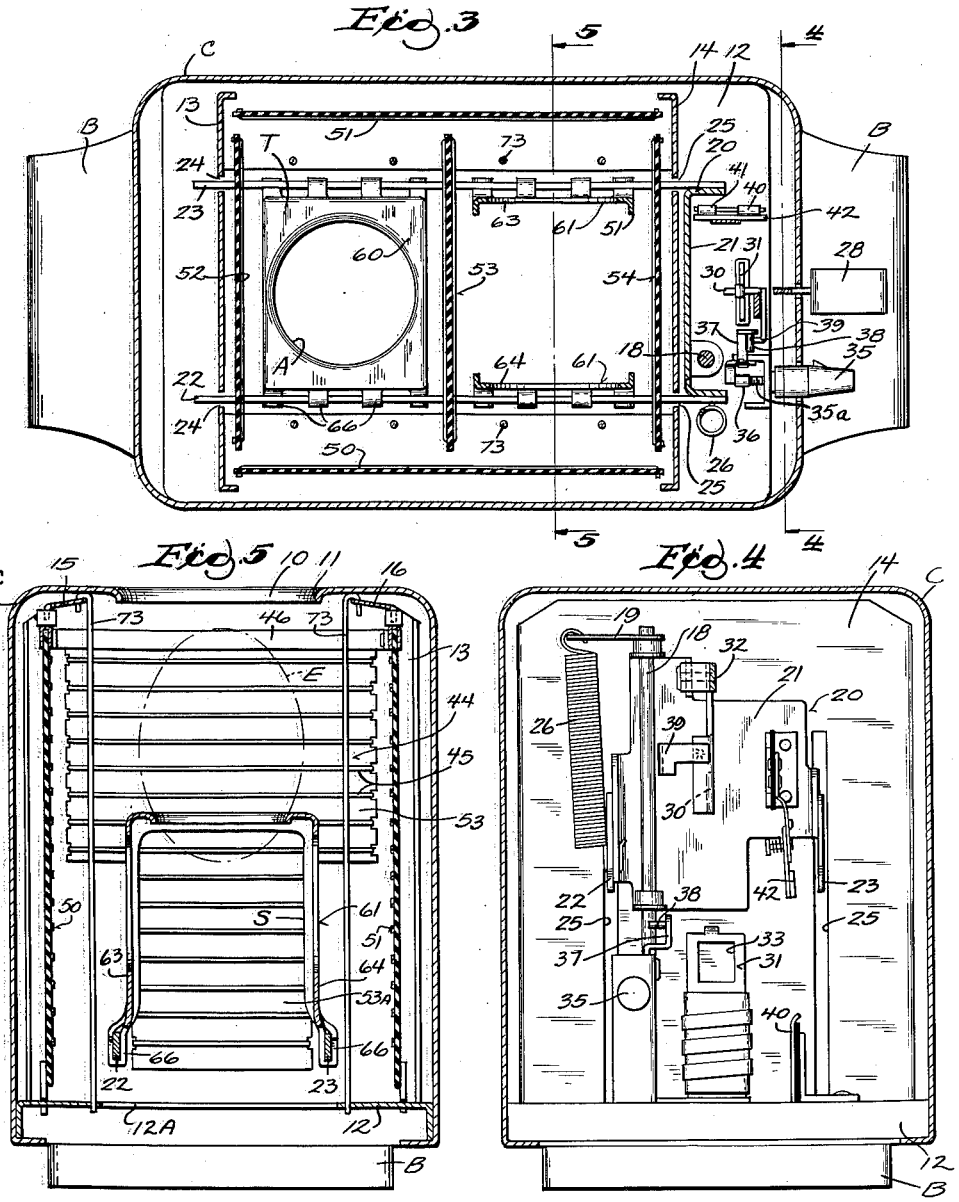
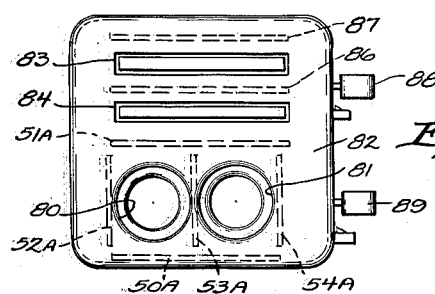
INVENTOR.
WALTER R. LINDEMANN
BY
Lieber, Lieber & Nilles
ATTORNEYS 3,065,688
EGG COOKER
Walter R. Lindemann, 6109 N. Lake Drive,
Whitefish Bay, Wis.
Filed July 26, 1960, Ser. No. 45,409
1 Claim. (Cl. 99—329)

The present invention relates to an automatic electric egg cooker of the waterless type.

It has heretofore been proposed to cook eggs by electric heat, such as for example, by surrounding the egg with suitable electric resistance heating elements. For various reasons, however, the great majority of these prior art devices have not proved to be successful. One of the shortcomings has been the difficulty in preventing overcooking of the egg after the device had turned off. In other words, one of the difficulties has been to dissipate the heat quickly after cooking of the egg to the desired degree was accomplished, in order to prevent overcooking of the egg.

The present invention provides a pop-up egg cooker by means of which an egg is uniformly and quickly cooked to the desired degree by electricity.

Accordingly, it is an object of the present invention to provide an automatic electric egg cooker in which the finished egg is automatically removed from the heat source at the end of a predetermined time, and the residual heat from the heat source is permitted to quickly pass from the cooker and does not remain in the area of the finished egg.

A more specific aspect of the present invention is to provide an egg cooker of the above type having a vertically shiftable egg carrier in which the egg is firmly supported in a stable position and at the same time permits the simultaneous application of heat to all sides of the egg as well as to the bottom thereof, and also provides good air and heat distribution around the egg during cooking. Thereby rapid and uniform cooking of the egg is insured. In addition, when this egg carrier is elevated to position the egg out of the cooking area, the construction of the carrier is such that the heat from the cooking area is permitted to pass easily and completely out of the cooking device.

The invention provides an automatic electric egg cooker in which heat is simultaneously applied to all sides of the egg and also to the bottom of the egg, and the air in the cooking area is able to freely circulate completely around the egg to thereby insure uniform and rapid cooking thereof. When the egg is finished to the desired and predetermined amount, it is ejected upwardly out of the heating area where it may be readily removed.

These and other objects and advantages of the present invention will appear as this disclosure progresses, reference being had to the accompanying drawings, in which:

FIGURE 1 is a perspective view of an electric egg cooker utilizing the present invention;

FIGURE 2 is a vertical, sectional view through the cooker shown in FIGURE 1, but on an enlarged scale, certain parts shown as being broken away and others removed for clarity in the drawing;

FIGURE 3 is a horizontal, sectional view taken generally along the line 3—3 in FIGURE 2;

FIGURE 4 is a vertical, sectional view taken generally along the line 4—4 in FIGURE 3;

FIGURE 5 is a vertical, sectional view taken generally along line 5—5 in FIGURE 3;

FIGURE 6 is a wiring diagram of the cooker shown in FIGURES 1–5;

FIGURE 7 is a perspective view of a modified form of egg supporting carrier, and FIGURE 8 is a plan view of a modified form of cooker.

Referring in greater detail to the drawings, the outer casing C may be deep-drawn or stamped from stainless steel and is secured to base members B of insulating material such as Bakelite or the like. The top of the casing has two round apertures 10 therein which are each defined by an inwardly turned flange 11. These apertures are of a size sufficient to permit a large egg E to pass therethrough and in addition provide a clearance space all around the egg when the latter has been raised as shown in FIGURE 2.

Mounted within the casing is a sheet metal base plate 12 which has a large opening 12A in its central portion for the entry of air into the cooker from its underside. A pair of spaced apart, vertical walls 13 and 14 are secured to plate 12 and extend upwardly therefrom. The top edges of these two walls are secured together by two braces 15, 16, which are secured at their ends to these walls.

A vertical mounting pole 18 is rigidly secured at its upper end by a bracket 19 fixed to wall 14, and at its lower end in the plate 12.

An ejector 20 is reciprocatingly mounted by its vertical plate 21 on the pole 18 and is adapted to be vertically shiftable between the raised position shown in FIGURE 2 and the lowered, cooking position shown in FIGURE 5. The ejector 20 also includes a pair of horizontal arms 22 and 23 which are secured at one of their ends to plate 21 and extend through vertical guide slots 24 and 25 in walls 13 and 14, respectively.

A spring 26 acting between bracket 19 and the ejector urges the latter to the raised position.

The handle 28, which is rigidly secured to plate 21 of the ejector, is used to push the ejector down to the cooking position where the latch 30 that is pivoted on the ejector engages the bi-metallic holding element 31 mounted on base plate 12. Latch 30 is pivoted at 32 to the ejector plate 21, and has an inclined lower surface which slidingly rides against and over the upper edge of element 31 as the ejector is lowered to cause the latch 30 to pivot or swing to the right, as viewed in FIGURE 2, thereby slipping past the upper edge and becoming engaged in the opening 33 (FIG. 4) of the element 31. When so engaged, the ejector is held down in the cooking position against the bias of spring 26.

The bi-metallic element serves to hold the ejector down until the element is heated sufficiently to cause it to warp enough to free the catch 30, permitting the ejector to be raised by the spring.

Suitable dash-pot or other cushioning means (not shown) may be used to cushion the stop of the ejector at the upper end of its travel.

A timing mechanism is provided for predetermining the length of time which the ejector will remain down in the cooking position. For purposes of illustrating the invention, this mechanism has been shown as a rotatable knob 35 that has a stop 36 in threaded engagement with its shaft 35a. The stop travels toward or away from the knob as the latter rotates in one direction or other. The stop abuts against one end of a pivoted lever 37, and a pin 38 is secured at the other end of this lever. The pin in turn bears against an arm 39 on latch 30. Adjustment of knob 35 thereby varies the position of pivoted latch 30 when in the lower position, that is, it varies the amount or extent by which latch 30 is engaged in the bi-metallic element, more particularly, in the opening 33 of the element. Stated otherwise, knob 35 varies the amount of movement of the bi-metallic element 31 which is necessary before the latch is freed therefrom.

The timing of the egg to be cooked is important and is, in fact, critical if an egg is desired having an exactly specified degree of finish. Once this degree of finish is obtained, the egg must be removed from the cooking area quickly, and the remaining heat permitted to pass from the area of the finished egg. However, other forms of timing and release devices may obviously be used with the present invention, and the scope of the latter should not be limited to the forms shown herein for illustrative purposes only.

As shown in FIGURES 3, 4 and 6, an electrical switch is provided so that the electrical circuit is closed and operative when the ejector is in the lowered position. This switch includes two terminals 40 and 41 mounted on the base plate, and a knife 42 carried by the ejector which forms a connection between the terminals when in the lowered position.

The heating elements to be referred to may be of various types but those shown for the purpose illustrating the invention are of the type which have an insulating sheet of mica 44 which may become electrically conducting at operating temperatures, and a resistance heating conductor such as wire 45 wound around these sheets. Suitable interconnecting bars 46 electrically connect the wires of the various sheets together and to the terminal 47.

Two cooking chambers or areas are provided, one for each of the two eggs that may be cooked at one time in the device shown in FIGURES 1 to 6. These cooking chambers are defined by two heating elements 50 and 51 extending in spaced apart, parallel relationship along two sides of the inside of the cooker; and by three heating elements 52, 53 and 54 that extend at right angles to elements 50 and 51. Elements 52 and 54 are located at the ends of elements 50 and 51, and the element 53 is located intermediate the lengths of elements 50 and 51. It will be noticed that the long side elements 50 and 51, and a central portion 53A only of the central element 53 extend downwardly to the bottom of the interior of the chambers. The short end elements 52 and 54 terminate about half way down the interior height of the chambers. It will be noted, however, that when the eggs are lowered to the cooking position they are completely surrounded on four sides by heating elements.

With the arrangement and relative sizes of heating elements as shown, the three transversely arranged elements 52, 53 and 54 are preferably wired in series with the elements 50 and 51 being wired in parallel.

That portion of the cooking chambers located beneath the eggs are heated by the lower portions of elements 50, 51 and 53 which are sufficient to furnish heat to cook the bottom of the egg uniformly with the rest of the egg.

The egg carriers, about to be described, permit the heat from the lower portion of the chambers to not only pass upwardly into intimate contact with the egg, but furthermore, permit free flow and circulation of heat around the egg for uniform and simultaneous cooking of all portions of the egg.

The ejector 20, earlier referred to, also includes egg carriers 60 and 61 which are secured on and between the arms 22 and 23 and extend upwardly therefrom. These carriers may be of different forms, and the form shown in FIGURES 2, 3, and 5 are made from steel sheet material and include a top T (FIG. 3) that has an aperture A therein which forms a stable seat for the egg to rest, end up. The carriers are completely open at two of their sides S, S1 (FIGURES 3 and 5) and even their other two sides, which form the legs 63 and 64, are apertured as at 63A and 64A (FIG. 2) to open them up to free passage of heat therethrough. The carriers may be fastened in any suitable manner to arms 22 and 23 or they may be made integral therewith. Carriers 60 and 61 are shown as having ears 66 along the bottom of their two sides, which ears are wrapped in alternate directions around the arms.

The carrier 70 shown as a modification in FIGURE 7 is made of wire and is spot welded to arms 22A and 23A.

In either form of carrier shown, it will noted that the carrier is of open framework, which construction does not create an enclosure or pocket in which the heat may be entrapped or which would prevent circulation of air. Instead, the egg is held securely in the circular pocket formed by the aperture A or carrier 70 at the top of the carrier. When in the lowered position, the bottom of the egg is subjected to heat from the bottom of the chamber, which heat flows upwardly past the egg. All sides of the egg are subjected to the direct infra-red heat waves generated by the heating elements around the egg.

Guide means in the form of generally vertically arranged rods 73 are provided for insuring that the eggs are guided when being raised, through the pertures 10 in the casing. Ordinarily these wires would be unnecessary because of the firm seat provided in top of the carriers. Once the eggs are lowered into the casing, however, a jar or bump on the cooker may cause the eggs to tip or tilt slightly, and cause them to bind or jam in the casing openings. The rods insure smooth and immediate exit of the eggs out of the cooking area.

FIGURE 8 shows a modified form of cooker useable with the present invention. It is similar to the FIGURE 1 device as far as the egg cooker portion is concerned, and in this respect has apertures 80 and 81 in the top of the modified and enlarged casing 82 and heating elements 50A, 51A, 52A, 53A and 54A which may be similar to the correspondingly numbered elements in the FIGURE 1 structure. The casing 82 also houses a conventional two piece bread toaster which is loaded through slots 83 and 84 in the casing top. Heating element 51A is common to the egg cooker side and the toaster side of the modification, and elements 86 and 87 complete the elements used with this form. The cooker and toaster sides are wired separately and each have their own controls, indicated generally at 88 and 89, respectively, and which may be similar to those of the FIGURE 1 device.

Other forms and numbers of combinations of egg cooking and bread toasting chambers may be utilized with the present invention.

By means of the present invention an automatic and electric egg cooker of the pop-up type has been provided in which infra-red heat is applied simultaneously all around the egg. The arrangement is such that uniform heat and air circulation occurs around the egg, to simultaneously drive the heat into the egg from all directions. When the predetermined cooking time has terminated, the egg is elevated gently out of the cooking chamber and the residual heat escapes quickly to thereby have no appreciable cooking effect on the finished eggs.

Various modes of carrying out the invention are contemplated as being within the scope of the following claim particularly pointing out and distinctly claiming the subject matter which is regarded as the invention.

I claim:

An electric egg cooker comprising, a casing having a top side containing a pair of apertures therein through each of which an egg is adapted to pass with heat releasing clearance area on all sides thereof, a vertically shiftable and open framework egg carrier within said casing and shiftable between an upper, inoperative position and a lower cooking position, said carrier including a pair of arms extending longitudinally of the casing and legs extending upwardly from said carrier and supporting a pair of apertured top members which form a pair of open seats in alignment with said apertures in each of which an egg is adapted to be firmly held, generally vertically positioned resistance heating elements which form a pair of cooking chambers in said casing, said heating elements being in direct and completely unobstructed proximity to and completely surrounding said top members of said carrier when the latter has been lowered to the cooking position to subject an egg to direct infra red rays, end ones of said elements terminating just below the seats in their lower cooking position, a heating element intermediate said apertured top members and parallel with the end elements extending below the said top members of said carrier and down well below the level of the seats in their lower position, said arms of the carrier straddling the lower portion of said intermediate element and movable vertically in a region below the end elements, longitudinal ones of said heating elements extending parallel to and outwardly of said pair of arms and extending below the said top members of said carrier and down well below the level of the seats in their lower position, a base plate forming part of the casing having large openings below the carrier and in alignment with said seats, said openings being open to the atmosphere whereby heat by convection is supplied to an egg bottom through said open seat, to evenly heat the sides and bottom of the egg, spring means connected between said carrier and casing and biasing said carrier upwardly, an adjustable timer in said casing and operatively connected with said carrier, means for adjusting said timer from outside said casing, said timer acting to cause said carrier to be elevated by said spring means at the end of a predetermined period, whereby said carrier elevates an egg out of said chamber and through one of said apertures and permits the remaining heat in said chamber to pass freely therefrom through said clearance area.

References Cited in the file of this patent

UNITED STATES PATENTS

| | | |
|---|---|---|
| 2,257,883 | McCarthy | Oct. 7, 1941 |
| 2,459,933 | Gommersall | Jan. 25, 1949 |
| 2,562,991 | Rothschild | Aug. 7, 1951 |
| 2,630,062 | Litt | Mar. 3, 1953 |